(12) United States Patent
Tanaka et al.

(10) Patent No.: US 6,856,254 B1
(45) Date of Patent: Feb. 15, 2005

(54) ELECTRONIC DEVICE, ELECTRONIC DEVICE SYSTEM CONTROL METHOD AND ELECTRONIC DEVICE SYSTEM

(75) Inventors: Mayuko Tanaka, Chiyoda-Ku (JP); Yoshimichi Kudo, Chiyoda-ku (JP); Tsukasa Hasegawa, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/018,270
(22) PCT Filed: May 12, 1999
(86) PCT No.: PCT/JP99/02448
  § 371 (c)(1),
  (2), (4) Date: Oct. 29, 2001
(87) PCT Pub. No.: WO00/70829
  PCT Pub. Date: Nov. 23, 2000
(51) Int. Cl.[7] .............................................. G08B 21/00
(52) U.S. Cl. ...................... 340/687; 340/687; 345/839
(58) Field of Search ............................ 340/687, 686.1, 340/691.6, 635, 310.08; 345/839, 733, 853, 744; 709/220, 229; 700/12, 17, 27

(56) References Cited

U.S. PATENT DOCUMENTS 5,751,221 A * 5/1998 Stanfield et al. ............ 340/5.74
5,793,366 A   8/1998 Mano et al.
6,308,239 B1 * 10/2001 Osakada et al. ............. 710/316
6,313,880 B1 * 11/2001 Smyers et al. .............. 348/552

FOREIGN PATENT DOCUMENTS

| JP | 7-250072 A | 9/1995 |
| JP | 9-331342 A | 12/1997 |
| JP | 10-177539 A | 6/1998 |
| JP | 10-187583 A | 7/1998 |
| JP | 9-116819 A | 8/1998 |
| JP | 11-163866 A | 6/1999 |
| JP | 11-168483 A | 6/1999 |

OTHER PUBLICATIONS

Michael Teener, "A Bus on a Diet—The Serial Bus Alternative" *1992 IEEE Compcon Spring (IEEE Computer Society International Conference)* pp. 316–321 (Technical reference about IEEE P1394 High Performance Serial Bus.

* cited by examiner

Primary Examiner—Anh V. La
(74) Attorney, Agent, or Firm—Townsend and Townsend and Crew LLP

(57) ABSTRACT

An electronic device connected to a network corresponding to plug & play and hot plug functions and enabled to control other electronic devices is provided with communication route detecting unit for detecting a communication route between electronic devices being used or reserved for communication and notifying unit for notifying the user of a result of detection by the communication route detecting unit. The above-described electronic device is configured so as to detect a communication route between subject electronic devices to be used for communication and notify the user of the electronic devices on the communication route, which must not be disconnected from the network with use of the communication unit. Consequently, the user can be prevented from accidental disconnection of the cable of a subject electronic device, thereby preventing the disconnection of the device from the network.

24 Claims, 13 Drawing Sheets

| DEVICE ID | 103 | |
|---|---|---|
| NODE ID | 5 | |
| NUMBER OF PORTS | 3 | |
| PORT CONNECTION INFORMATION | P0 | 11 |
| | P1 | 11 |
| | P2 | 01 |
| DESTINATION INFORMATION | P0 | 4 (PC) |
| | P1 | 3 (D-VCR) |

(b)

| DEVICE ID | 104 | |
|---|---|---|
| NODE ID | 3 | |
| NUMBER OF PORTS | 3 | |
| PORT CONNECTION INFORMATION | P0 | 10 |
| | P1 | 11 |
| | P2 | 01 |
| DESTINATION INFORMATION | P0 | 0 (D-CAM) |

PORT CONNECTION INFORMATION
    11: CONNECTED TO CHILD DEVICE
    10: CONNECTED TO PARENT DEVICE
    01: UNCONNECTED

FIG.7

| DEVICE ID (DEVICE NAME) | | 103 (IRD) | | |
|---|---|---|---|---|
| NODE ID | | 5 | | |
| NUMBER OF PORTS | | 3 | | |
| | | CONNECTION STATE | DESTINATION NODE ID | DEVICE ID (DEVICE NAME) |
| CONNECTION INFORMATION | P0 | 11 | 4 | 102 (PC) |
| | P1 | 11 | 3 | 104 (D-VCR) |
| | P2 | 01 | - | - |
| DEVICE ID (DEVICE NAME) | | 104 (D-VCR) | | |
| NODE ID | | 3 | | |
| NUMBER OF PORTS | | 3 | | |
| | | CONNECTION STATE | DESTINATION NODE ID | DEVICE ID (DEVICE NAME) |
| CONNECTION INFORMATION | P0 | 10 | 0 | 105 (D-CAM) |
| | P1 | 11 | 5 | 103 (IRD) |
| | P2 | 01 | - | - |
| DEVICE ID (DEVICE NAME) | | 102 (PC) | | |
| NODE ID | | 4 | | |
| NUMBER OF PORTS | | 3 | | |
| | | CONNECTION STATE | DESTINATION NODE ID | DEVICE ID (DEVICE NAME) |
| CONNECTION INFORMATION | P0 | 11 | 1 | 101 (D-TV) |
| | P1 | 11 | 2 | 106 (PRINTER) |
| | P2 | 10 | 5 | 103 (IRD) |

CONNECTION INFORMATION
 11: CONNECTED TO CHILD DEVICE
 10: CONNECTED TO PARENT DEVICE
 01: UNCONNECTED

ELECTRONIC DEVICE, ELECTRONIC DEVICE SYSTEM CONTROL METHOD AND ELECTRONIC DEVICE SYSTEM

TECHNICAL FIELD

The present invention relates to an information-related home electric appliance enabled to construct a network corresponding to play & plug and hot plug functions via a digital interface regulated by the IEEE1394, etc. More particularly, the present invention relates to a device for controlling other devices remotely and managing states of data transfer with and among those devices in communications.

BACKGROUND ART

Now that personal computers are used widely in general homes for the purpose of doing various operations, such as accessing the Internet, the word of "network" is becoming very familiar to general users. In addition, there have appeared various digital information-related home appliances such as digital video cassette recorders, digital video cameras, etc., so that users can construct even intra-home networks easily in their homes now, since those appliances are provided with an IEEE1394 interface respectively. On the contrary, the IEEE1394 standard, expecting on the basis of the experience from the SCSI bus that the standard will be used by those general users more and more, has realized a plug & play function for assigning an ID to a device automatically so as to construct such an intra-home network just by connecting the device to a network, as well as a hot plug function for enabling the device to be disconnected/connected from/to the network while the device is powered. The IEEE1394 standard has also enabled devices to be connected at higher freedom, for example, by any of the daisy chain method and the node branching method. Both methods can also be used together.

The plug & play AV system disclosed in JP-A-116819/1997, giving consideration to unskilled users, uses a digital interface that can detect each newly connected/disconnected AV device so as to enable various required settings to be made and the set items to be displayed automatically. Consequently, when the cable of an AV device is disconnected, a warning message is displayed so that the user can know which device is disconnected.

The above-described conventional technique, however, displays such a warning message after the cable disconnection, so it cannot prevent such an accidental case where a program the user has watched is shut down due to the disconnection of the AV device cable, thereby the device is disconnected from the network.

DISCLOSURE OF THE INVENTION

Under such circumstances, it is an object of the present invention to prevent such an accident that the user disconnects a device cable, thereby the device is disconnected from a network by notifying the user of the devices that must not be disconnected from the network beforehand.

In order to achieve the above object, the present invention provides a technique for providing each electronic device connected to a network with connection information storing means for storing connection information of an interface port of the electronic device.

At least one (controller) of the electronic devices connected to the network is provided with means for controlling other devices so as to control them remotely via the network and transfer data to those devices via the device (controller). The device (controller) is further provided with communication route detecting means for detecting a communication route between devices being used or reserved for communication and notifying means for notifying the user of a communication route detected by the communication route detecting means. Hereinafter, the device provided with the functions will be referred to as a controller.

The controller composed and connected to a network as described above, when in communication with any of other devices, requests all of those other devices for connection information so as to detect the communication route between subject devices with use of the received connection information. The controller then notifies the user that the devices connected to the detected communication route must not be disconnected from the network.

Consequently, the user can prevent an accidental disconnection of a cable from a device that must not be disconnected from a network during communication, thereby preventing disconnecting of the device from the network.

Furthermore, the controller is provided with disconnection detecting means for detecting disconnection from a communication route detected by the communication route detecting means so that notifying means notifies the user of a disconnected portion when the disconnection detecting means detects disconnection from the communication route.

Because a disconnected point of the communication route is notified to the user such way, the user can recover the communication route from disconnection immediately.

BRIEF DESCRIPTION OF THE DRAWINGS

FIG. 5 is a configuration of connection information.

FIG. 7 is a configuration of network connection information.

BEST MODE FOR CARRYING OUT THE INVENTION

Hereunder, the preferred embodiments of the present invention will be described with reference to the accompanying drawings.

Figure 1:
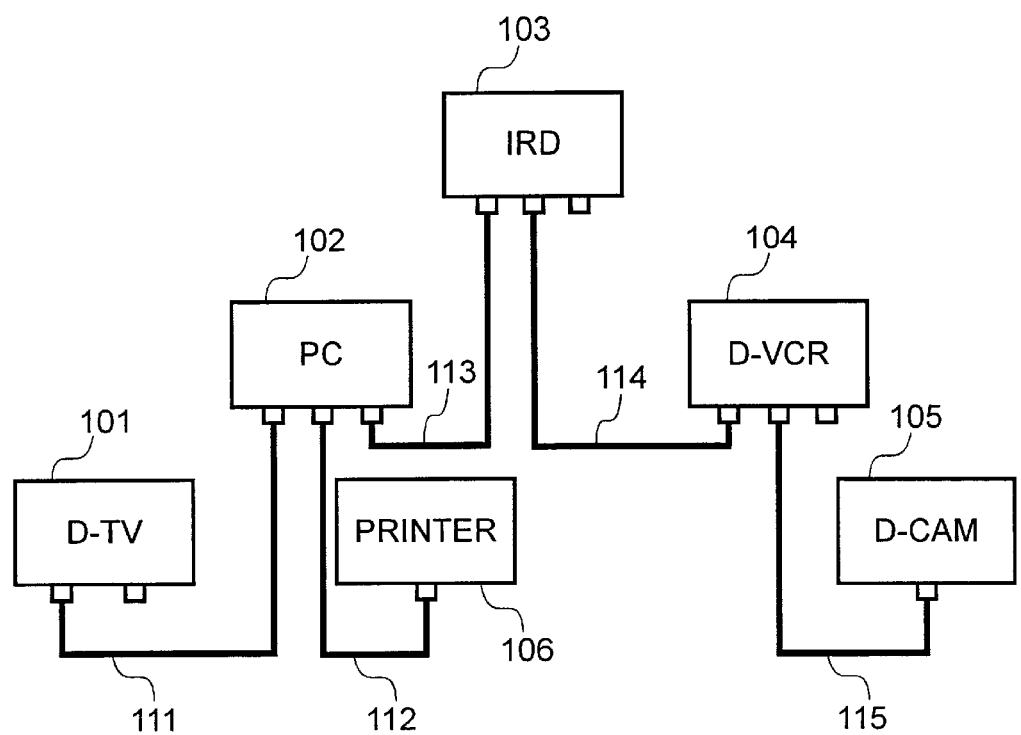
FIG. 1 is a block diagram of a network system of the present invention.

FIG. 1 shows a block diagram of a network system of the present invention. The network system is connected to a digital TV (hereinafter, to be described as the "D-TV") 101 enabled to receive and display digital image signals; a personal computer (hereinafter, to be described as the "PC") 102; digital satellite broadcasting receiver (hereinafter, to be described as the "IRD") 103; a digital video cassette recorder (hereinafter, to be described as the "D-VCR") 104; a digital video camera (hereinafter, to be described as the "D-CAM") 105; and a printer 106 via the digital interface port of each electronic device and cables 111, 112, 113, 114, and 115.

In this embodiment, it is assumed that each of the interfaces between the cables 111 to 115 and devices corresponds to the plug & play function that updates the network automatically, as well as the hot plug function that enables electronic devices to be connected/disconnected to/from the network while they are powered, and that each of the interfaces is such a bus interface as the IEEE1394 serial bus, which employs a protocol for recognizing whether or not the corresponding digital interface port is connected by means of the ID number, the address, etc. The interface is not limited only to the IEEE1394 serial bus, of course; the digital interface may be a USB (Universal Serial Bus).

Furthermore, in this embodiment, at least one of the electronic devices connected to the network is provided with a function for controlling other electronic devices and communications between the electronic devices connected to the network are done under the control of this device. Hereinafter, an electronic device provided with this function will be referred to as a controller. The rest electronic devices controlled by the controller will be referred to as controlled devices. The communication between those controlled devices means communication of such stream data as MPEG (Motion Picture Experts Group), etc.

In this embodiment, it is assumed that the IRD 103 is a controller and the rest devices are controlled devices. The rest devices may be controllers, of course.

The control protocol used by the controller for controlling controlled devices may be a method in which each controlled device uproads a program regulated by, for example, the HAVi (Home Video/Video interoperability) and used to control controlled devices to the controller and the controller controls the controlled devices with use of the program. The control protocol may also be a method regulated by the CEBus (Consumer Electronics Bus) that employs a regulated protocol for sending predetermined control commands to the controlled devices.

Figure 2:
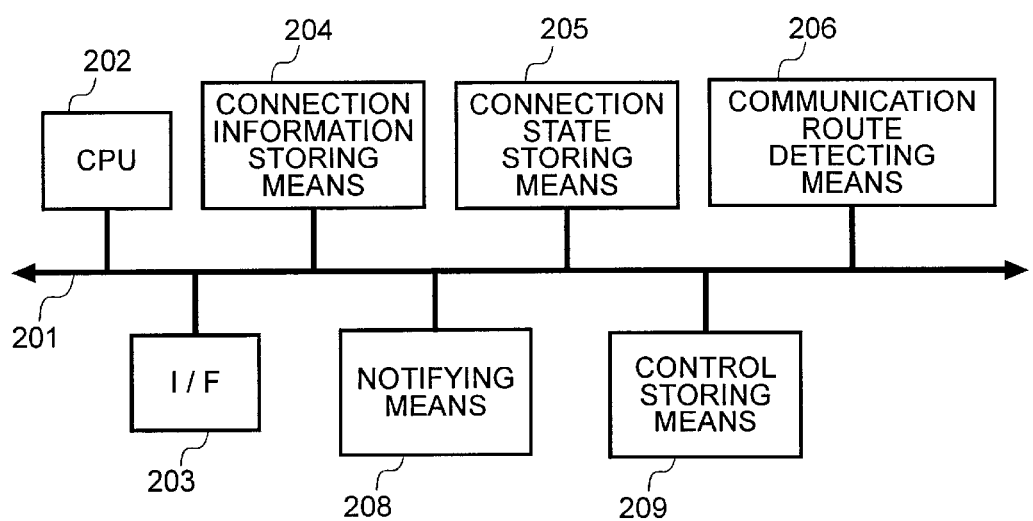
FIG. 2 is a simplified circuit diagram of a controller in an embodiment (first embodiment) of the present invention.

FIG. 2 shows a simplified circuit diagram of the IRD 103, which is a controller. The reference numeral 201 denotes a bus of the CPU 202 of the IRD 103. The bus 201 is used to exchange data between the IRD 103 and each controlled device. The reference numeral 203 denotes a digital interface. The reference numeral 204 denotes connection information storing means for holding a device ID specific to each electronic device, a node ID, the number of interface ports provided for the electronic device, and each port connection information. The reference numeral 205 denotes connection state storing means for storing connection information of each electronic device connected to a network and connection information of each electronic device connected to the network. The reference numeral 206 is communication route detecting means for detecting a communication route between electronic devices being used or reserved for communication with use of the connection information of electronic devices held in the connection state storing means. The reference numeral 208 denotes notifying means for notifying the user of a communication route detected by the communication route detecting means. The reference numeral 209 denotes control storing means for storing programs and data used to control controlled devices.

It is assumed here that each of the D-TV 101, the PC 102, the D-VCR 104, the D-CAM 105, and the printer 106 connected to a network is provided at least with devices equivalent to the digital interface 203 and the connection information storing means 204 shown in the circuit diagram of the IRD 103 in FIG. 2.

Hereunder, the first embodiment will be described in detail with reference to the accompanying drawings.

Figure 3:
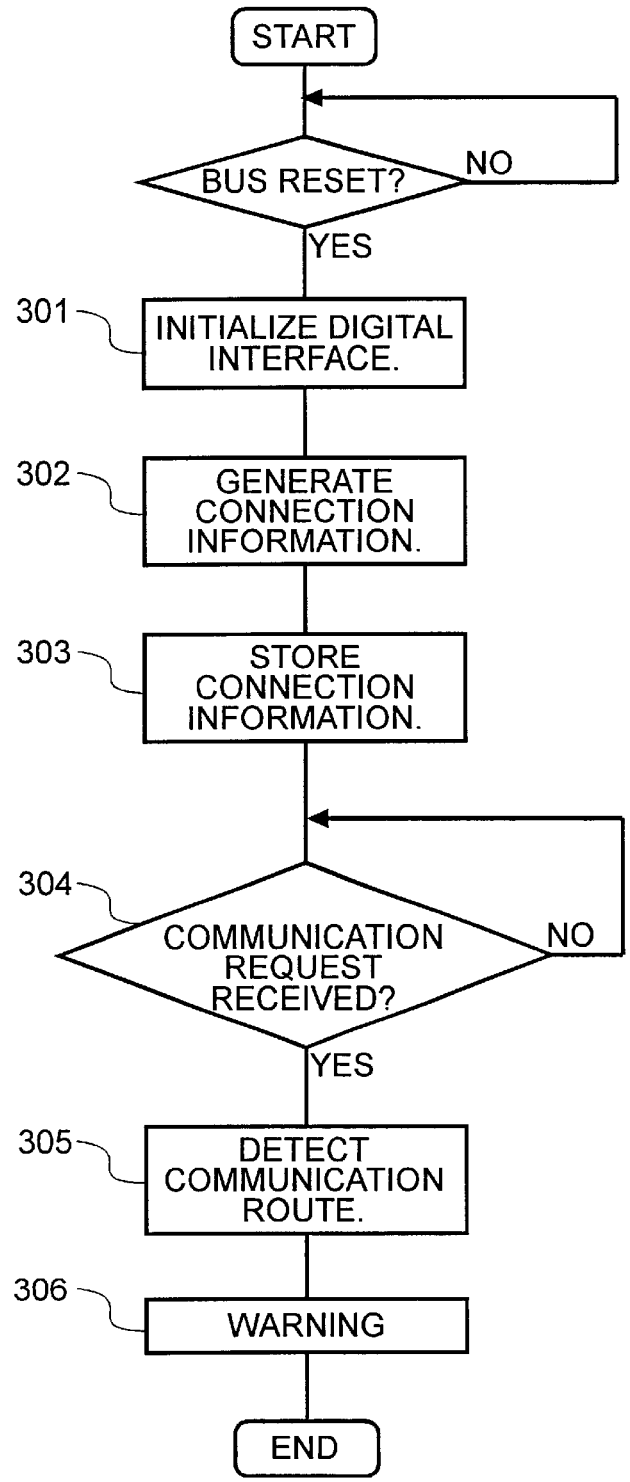
FIG. 3 is a flowchart for processings of the controller in an embodiment (first embodiment) of the present invention.

FIG. 3 shows a flowchart for processings of the controller in this first embodiment of the present invention to so as to prevent an accidental disconnection of a device from a network during an operation.

When an electronic device is connected to a network or when the electronic device is powered, a bus reset signal is generated, thereby the digital interface is initialized and a node ID is decided for each connected device (step 301). Then, the controller generates connection information for denoting the connection state of each port of the electronic device and stores the connection information in the connection information storing means 204 (step 302). Ending the initialization of the digital interface, the controller requests each controlled device for the connection information and stores the received connection information in the connection state storing means 205 (step 303). The controller monitors the communication request event or the communication reservation event between connected controlled devices in step 304. When a communication transfer request or communication reservation event is generated, the event becomes a trigger for the communication route detecting means 206 to detect a communication route between subject controlled devices (step 305). Ending the detection of the communication route, the controller notifies the user of the controlled devices that must not be disconnected from the communication route (step 306).

Next, a description will be made for the processing in each step in detail.
(1) Initialization of Digital Interface (Step 301)

Figure 4:
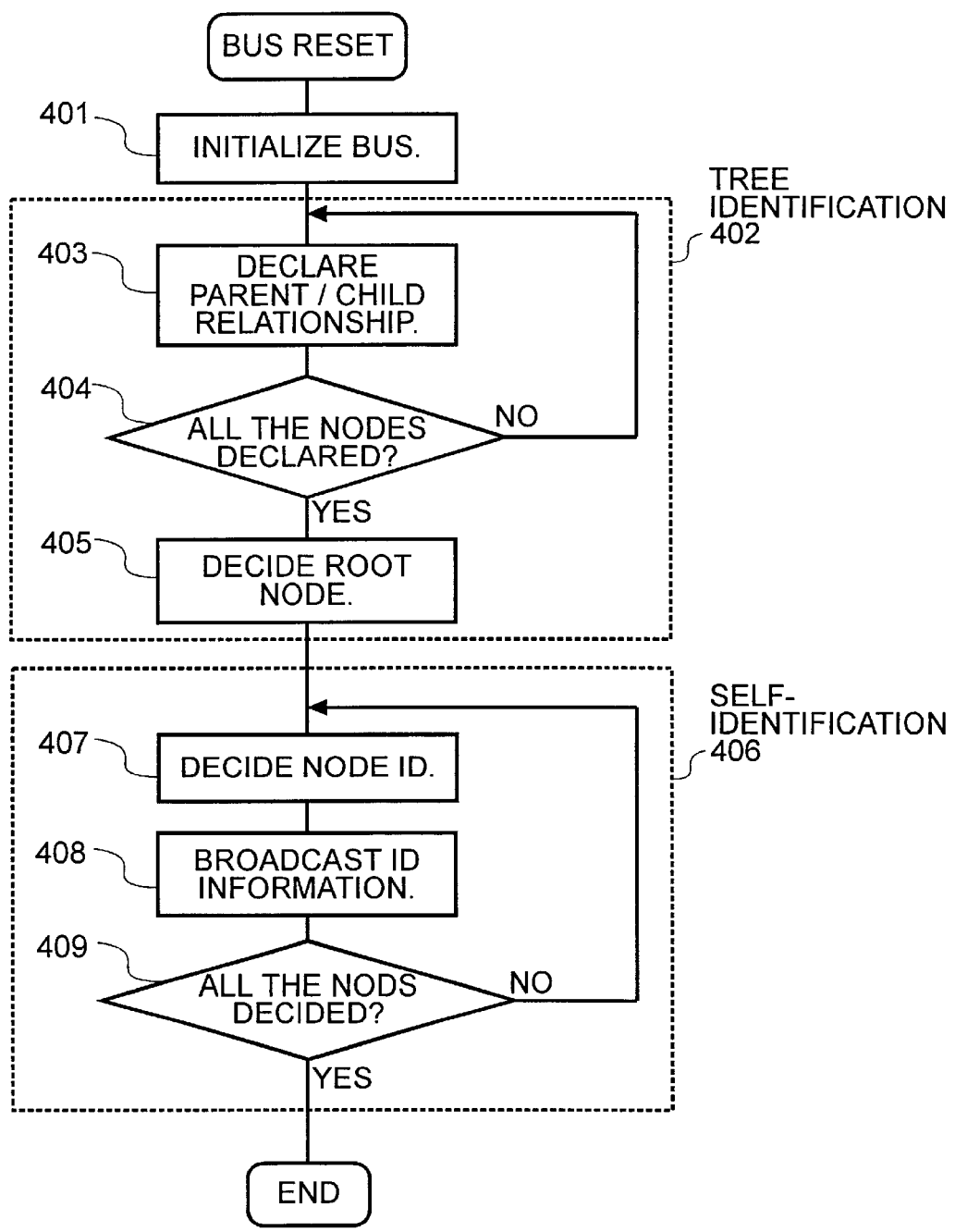
FIG. 4 is a flowchart for the initialization of an IEEE1394 serial bus executed in accordance with the IEEE1394 standard.

As described above in this first embodiment, the digital interface is assumed as an IEEE1394 serial bus. Hereinafter, therefore, the initialization procedure in accordance with the IEEE1394 serial standard will be described. FIG. 4 shows a flowchart for the initialization executed in accordance with the IEEE1394 serial bus standard.

When a node is connected to a network or the node is powered, a bus reset signal is generated, thereby the bus initialization in step 401 is started for the controlled device. In the initialization processing, the controller erases the topology-related information of the node and identifies whether the node connection type is "branch" in which the connection is done to two or more nodes or "leaf" in which the connection is done to only one node or the interface is completely isolated; the connection is not done to any node.

Next, control goes to the tree identification processing (in step 402).

In this tree identification processing, at first, each "leaf" node declares a parent and child relationship to a higher node sequentially and each "branch" node declares a parent and child relationship to a higher node sequentially (step 403). This processing is done for every node (step 404). Finally, a node assumed as the parent for all the connected ports becomes a "route node" (step 405).

When a "route node" is decided and the tree identification is ended, control goes to a self-identification processing (step 406).

In this self-identification processing, a node ID is set for each node sequentially, beginning at a leaf node positioned at the bottom of the tree structure (step 407). A node, when a node ID is set thereto, broadcasts its ID packet to other nodes so as to report the self node ID (step 408). A self-node ID is decided so that "0" is set for the node ID of a leaf node positioned at the bottom of the tree structure. This node broadcasts its node ID=0 to other nodes. This operation is repeated sequentially until the self node ID=1,2 . . . is reached.

The initialization of the digital interface is completed when it is completed to decide an ID for every node (step 409).

The self ID packet to be broadcast includes the self-node ID, the number of ports owned by the node, the number of ports connected to a network, information of the parent/child relationship of each port, etc.

(2) Generation of Connection Information (Step 302)

Hereinafter, a description will be made for a method for generating connection information. When a subject electronic device connected to a network is a "leaf" one, the connection information consists of a device ID specific to the device, a node ID, and port information including the number of ports owned by the device and the connection state of each of the ports. When the subject electronic device connected to a network is a "branch" one, the connection information consists of the connection information of the "leaf" device+the node ID information of each electronic device connected to each port. A device ID is equivalent to a unique vender ID stored in a configuration ROM, which is used worldwide so as to recognize each device when the device conforms to the IEEE1394 standard. The port information, as described above, is equivalent to the information included in each self ID packet generated when the digital interface is initialized. The node ID of each electronic device connected to each port is obtained by extracting the node ID from the self ID information broadcast in the initialization processing of the digital interface. A branch device, when receiving the self ID information of a child device, that is, an electronic device connected to a port, obtains the node ID of the connected device by extracting the node ID therefrom.

Figure 6:
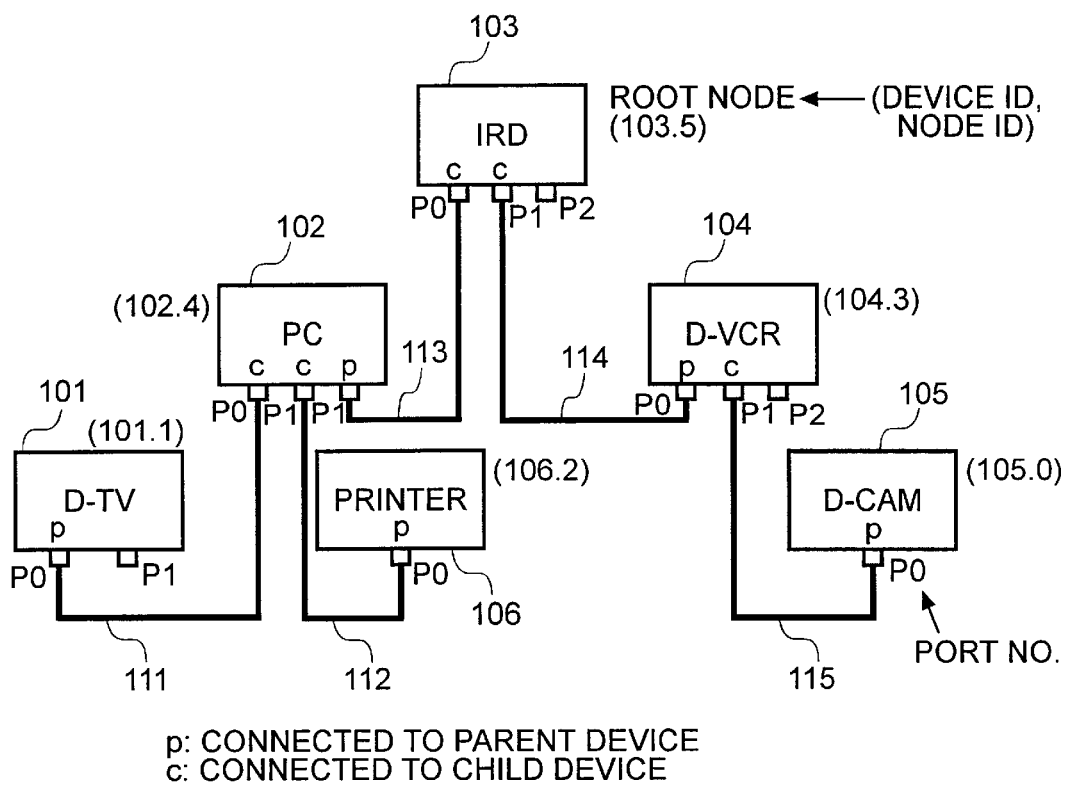
FIG. 6 is an example of a topology map of the network system of the present invention.

FIG. 5 shows a configuration of connection information when a parent/child relationship and a node ID are decided for a device as shown in FIG. 6 after the initialization of a digital interface. In FIG. 5, each data name is written in thick letters and each data is written in normal letters. FIG. 5(*a*) shows an example of connection information of the IRD 103 and FIG. 5(*b*) shows an example of the connection information of the D-VCR 104. In FIG. 6, the correspondence between each device and its device ID is decided as follows; D-TV 101=101, PC 102=102, IRD 103=103, D-VCR 104= 104, D-CAM 105=105, and printer 106=106. The correspondence between each device and its node ID is decided as follows; D-TV 101=1, PC 102=4, IRD 103=5, D-VCR 104=3, D-CAM 105=0, and printer 106=2. In FIG. 6, "p" denotes that a parent device is connected to the port and "c" denotes that a child device is connected to the port.

In FIG. 5, port connection information denotes whether or not an electronic device is connected to a subject port. P0 and P1 denote port 1 and port 2 respectively. Data "11' denotes that the port is connected to a child device and "10" denotes that the port is connected to a parent device. "01" denotes that nothing is connected to the port. The destination information is a node ID of an electronic device connected to the port. In FIG. 6, the device name is also described for easier understanding. Text information denoting each device name may be stored together with its node ID such way. The destination information records only the information of the ports connected to child devices in ascending order of port numbers. The connection information can be prevented from duplication when each electronic device describes only the connection information of child devices.

(3) Storing Connection Information (Step 303)

The controller requests each controlled device connected to a network for the connection information so as to generate the network connection state information of the network and stores the information in the connection state storing means 205. FIG. 7 shows a configuration of the connection state information. In FIG. 7, each data name is written in thick letters and each data is written in normal letters. Each connection state information may include connection information of every controlled device connected to the subject network. In this embodiment, however, the connection state information includes the connection states of only branch devices. This is because each leaf device is always connected to any one of branch devices, so that it is possible to obtain the connection state information of the whole network only from the connection information of branch devices.

Each connection state information consists of a device ID, a node ID, the number of ports, and each port connection information. Each port connection information consists of the connection state of each port, as well as the node ID and the device ID of each destination device. As shown in FIG. 7, text information denoting a device name may be stored together with a device ID.

(4) Monitoring a Communication Request (Step 304)

In this embodiment, the controller can control controlled devices and the user can control all the devices connected to a subject network via this controller. Therefore, the controller can manage all the states of the controlled devices connected to the network, so that the controller can recognize each communication request issued from a controlled device to another.

When the controller detects such a communication request or communication reservation request issued from a controlled device to another, control goes to a step for communication route detection.

(5) Detection of a Communication Route (Step 305)

A communication route is detected in two phases in this embodiment; a route between a source device that sends data and the controller is detected in one phase and a route between a sink device that receives data and the controller is detected in the other phase.

Figure 8:
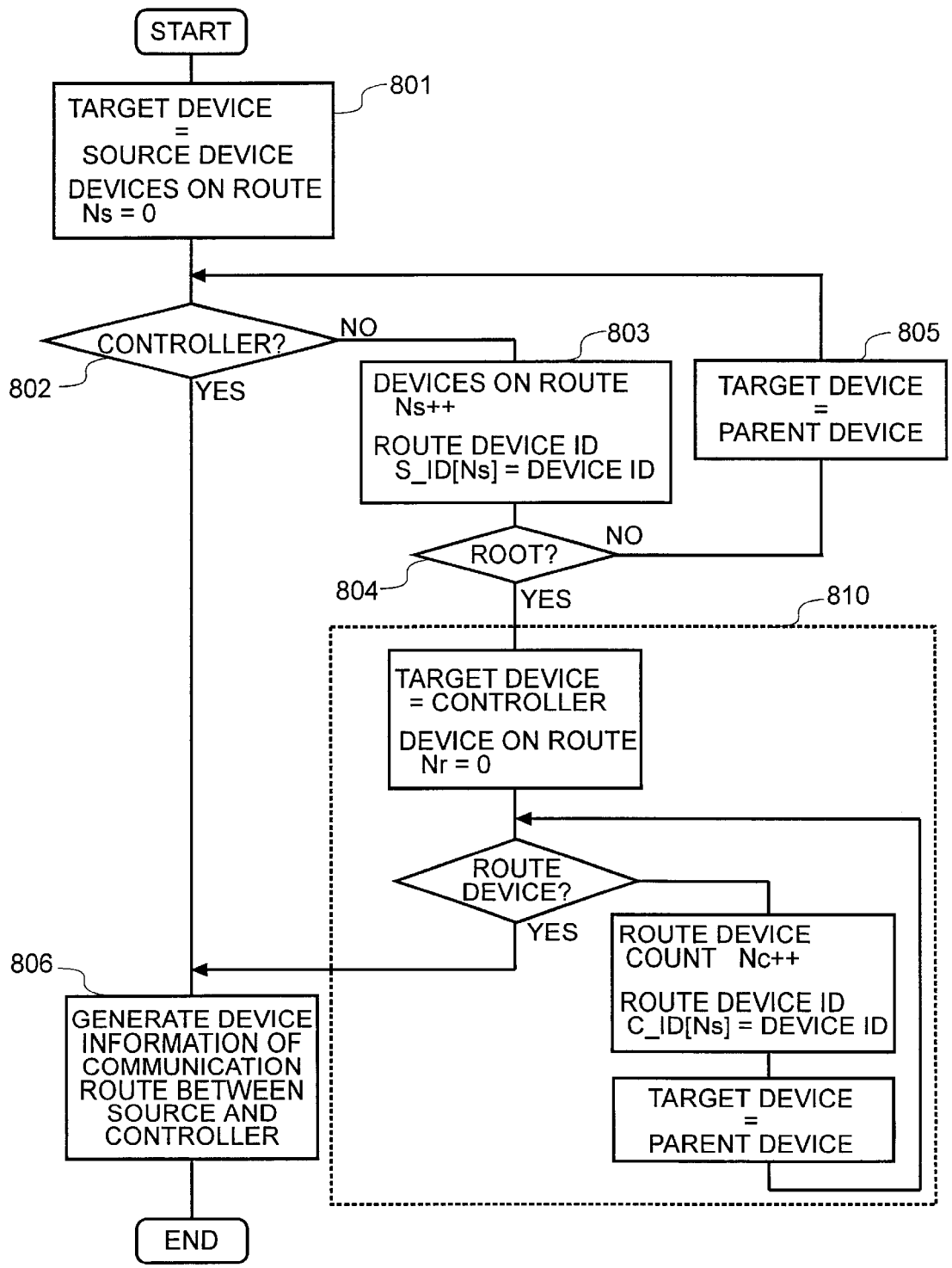
FIG. 8 is a flowchart for a communication route detecting algorithm used for between a source device and the controller.

FIG. 8 shows a flowchart for a route detection algorithm for detecting a communication route from a source device to the controller.

A communication route from a source device to the controller is detected as follows. At first, the controller is searched from the source device towards the route device, then the route is searched from the source device side (step 800). When the controller cannot be found in the search up to the route device, the searching is then done from the controller side (step 810) so as to search the controlled devices on the route from the source device towards the controller.

Hereinafter, a description will be made for the communication route detection algorithm employed for the route searching from a source device to the controller with reference to the flowchart shown in FIG. 8.

At first, a target device is set as a source device and the number of devices on the route is set to 0 (initialization). Then, the system goes to step 802 so as to refer to the connection state information and checks whether or not the controller is connected to a port of the target device. When the controller is connected, the source device and the controller are connected to each other directly. The system thus exits the processing. When the controller is not connected to any port of the target device, the system increases the number of devices on the route and adds the target device ID to the device IDs of the devices on the route (step 804). When the target device is a route device at this time, the system begins searching of the source device from the controller side (step 810). When the target device is not a route device, the system sets the parent device of the target device as the target device (step 805), then repeats the processings in steps 802 to 803.

The searching of the source device from the controller side (step 810) is also done in the same way as the communication route detection from the source device to the controller. The communication route detection from the controller side is ended when the source device and a controlled device among those on the route of the route device are detected.

After that, the detected communication route from the source device to the route device is combined with the communication route detected from the controller side so as to generate device information of the communication route from the source device to the controller (step 806). The communication route detection from the sink device to the controller is also done in the same procedure as that of the communication route detection from the source device to the controller as described above. The above two communication route detection results (the detected communication route from the sink device to the controller and the detected communication route from the source device to the controller) are combined so as to generate information of the communication route from the source device to the sink device.

(6) Notification to the User (Step 306)

When the information of the communication route from the sink device to the source device is generated as described above, the system notifies the user of the devices that cannot be disconnected from the communication route with use of the generated information.

In case where the user watches a movie played back by the D-VCR 104 on the D-TV 101 via a network as shown in FIG. 6 at this time, the route from the source device to the sink device includes the D-VCR 104, the IRD 103, the PC 102, and the D-TV 101.

Figure 9:
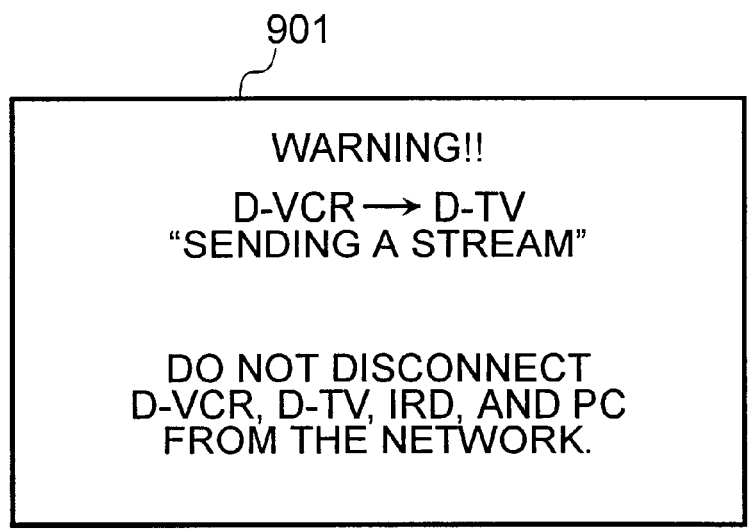
FIG. 9 is a notifying method used for a user.

FIG. 9 shows a method for notifying a user of the devices that cannot be disconnected from a network. The reference numeral 901 denotes such a notifying means as a liquid crystal panel provided for the controller. The notifying means displays how the current network is used, as well as the names of the electronic devices on a subject communication route. The system thus notifies the user of the electronic device used by the user at that time, as well as other electronic devices on the route that cannot be disconnected from the network. Although the warning message is represented as a text in this embodiment, the message may be represented graphically, for example, as icons, etc. for denoting those electronic devices.

As described above, according to the present invention, a communication route between subject devices is detected and the user is notified of the devices that cannot be disconnected from the network before starting the communication between the devices. Thus, the user is protected from accidental disconnection of the necessary devices from the network. This is an effect of the present invention.

While the warning message is displayed on the display means provided for the controller in the this embodiment, it is also possible to send and display the warning message on the screen of the D-TV 101/the PC 102 provided for the subject electronic device. This is another effect of the present invention.

When the controller is provided with means for making a sound, means for emitting or blinking a light so as to output a warning sound or light or both of them and attract the user's attention and prevent the user from accidental disconnection of necessary devices from the network, the above effects will be improved more.

Figure 10:
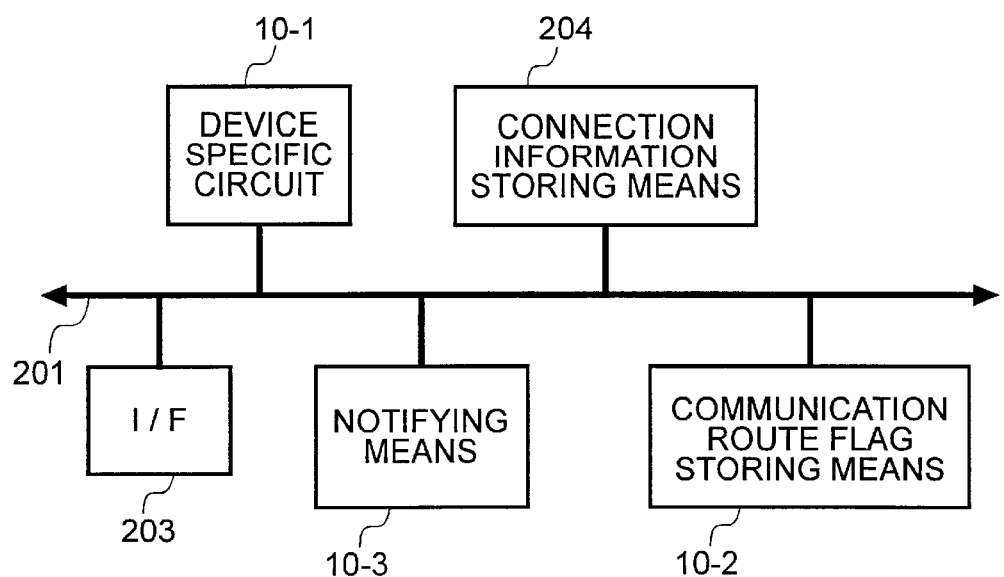
FIG. 10 is a circuit diagram of a controlled device.

Next, the second embodiment of the present invention will be described. Also in this second embodiment, the network configuration shown in FIG. 6 is employed. The configuration of the IRD 103, which is a controller, is the same as that shown in FIG. 2. FIG. 10 shows a circuit diagram of a controlled device connected to the controller. The circuit diagrams of the digital interface 203 and the connection information storing means 204 are the same as those shown in FIG. 2. The reference numeral 10-1 denotes a circuit for controlling functions specific to each electronic device. The reference numeral 10-3 denotes communication route flag storing means for storing a communication route flag for denoting that the flag-set electronic device is on the subject communication route. The reference numeral 10-2 denotes notifying means for notifying the user of the electronic devices that cannot be disconnected from the subject communication route.

Figure 11:
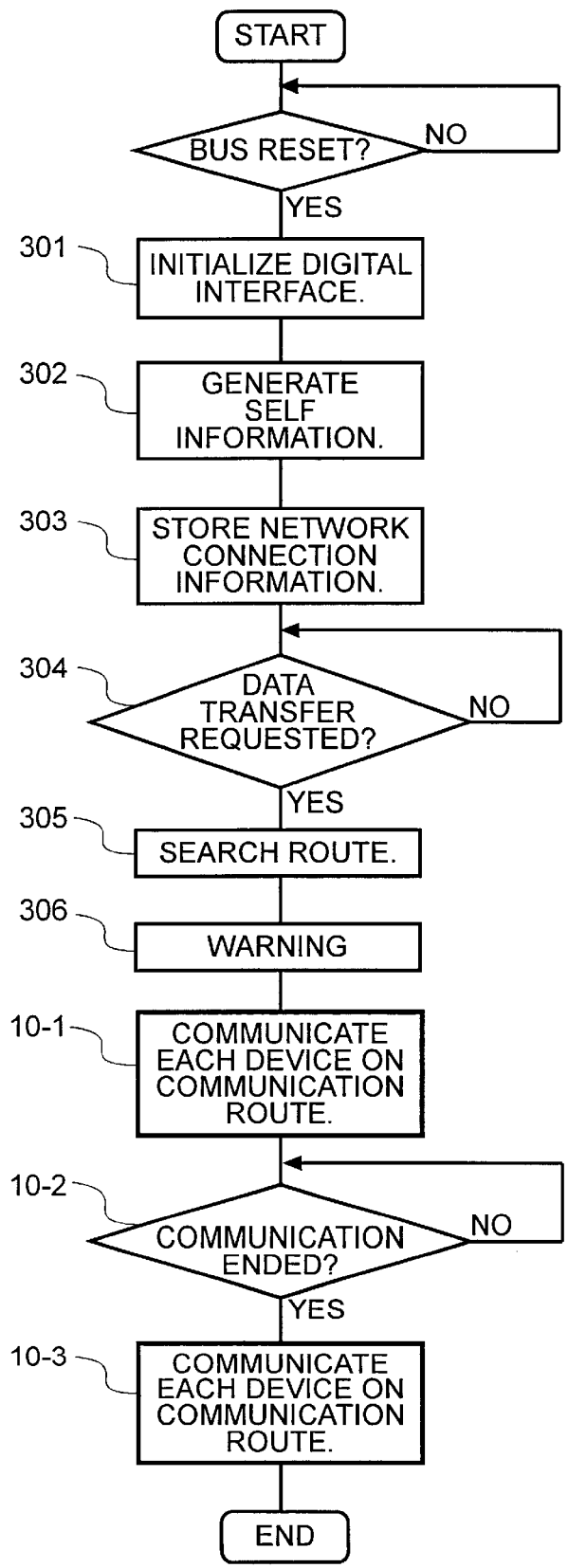
FIG. 11 is a flowchart for processings of the controller in another embodiment (second embodiment) of the present invention.

FIG. 11 shows a flowchart for the processings of the controller in the second embodiment of the present invention so as to protect the user from accidental disconnection of necessary electronic devices on a communication route from a network. In FIG. 11, the same step numbers will be used for the same processings as those shown in FIG. 3. In this second embodiment, the processings up to the notification to the user (step 306) are the same as those in the flowchart shown in FIG. 3 in the first embodiment. After the notification, the controller sends data used to set a communication route flag to each electronic device on the communication route and used for the communication (step 11-1). When the communication ends (step 11-2), the controller sends data used to reset the communication route flag to each of the flag-set electronic devices.

Each flag-set electronic device on the communication route is set is notified to the user by the notifying means 10-3. In case where the cable of an electronic device is disconnected while the communication route flag is set therein, the notifying means 10-3 notifies the user of the disconnection from the network.

For example, the electronic device is provided with an LED on the front panel so that the LED comes on when the communication route flag is set therein and the LED goes off when the flag is reset. When the cable of an electronic device is disconnected while the communication route flag is set therein, the LED blinks. Such way, the notifying means 10-3 notifies the user of the state of each electronic device by such an LED whose state is varied among the states of the device.

The notifying method may use any of a sound, a light, and blinking of a light, or a combination of those items. In case where an electronic device is provided with such means as a liquid crystal panel, etc. that can represent the states thereof with characters and graphic patterns, the warning (notification to the user) may be represented by those characters and graphic patterns.

In this second embodiment, because the user is notified of each device used on the subject communication route by the device itself, as well as by the controller, the user is prevented from accidental disconnection of the necessary devices from the network more effectively.

Figure 12:
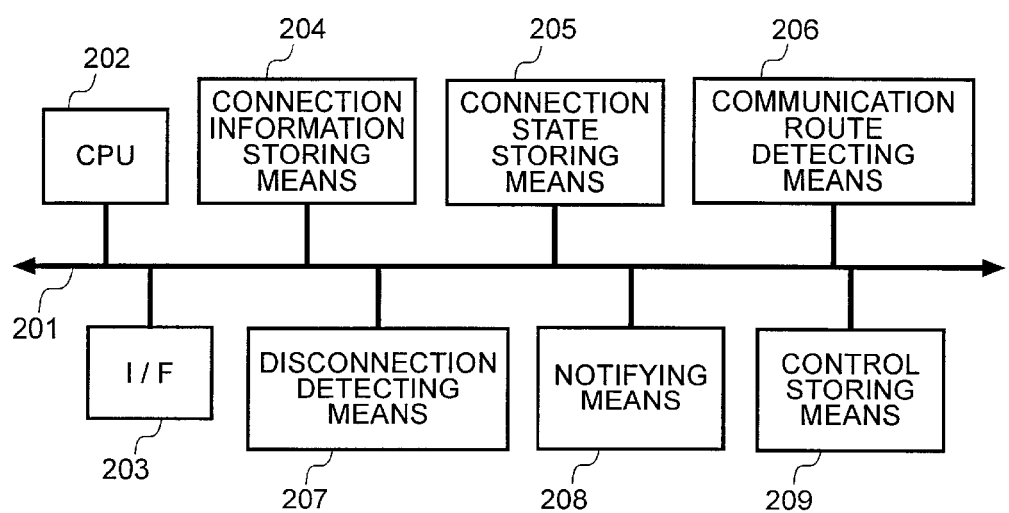
FIG. 12 is a simplified circuit diagram of the controller in still another embodiment (third embodiment) of the present invention.
Figure 13:
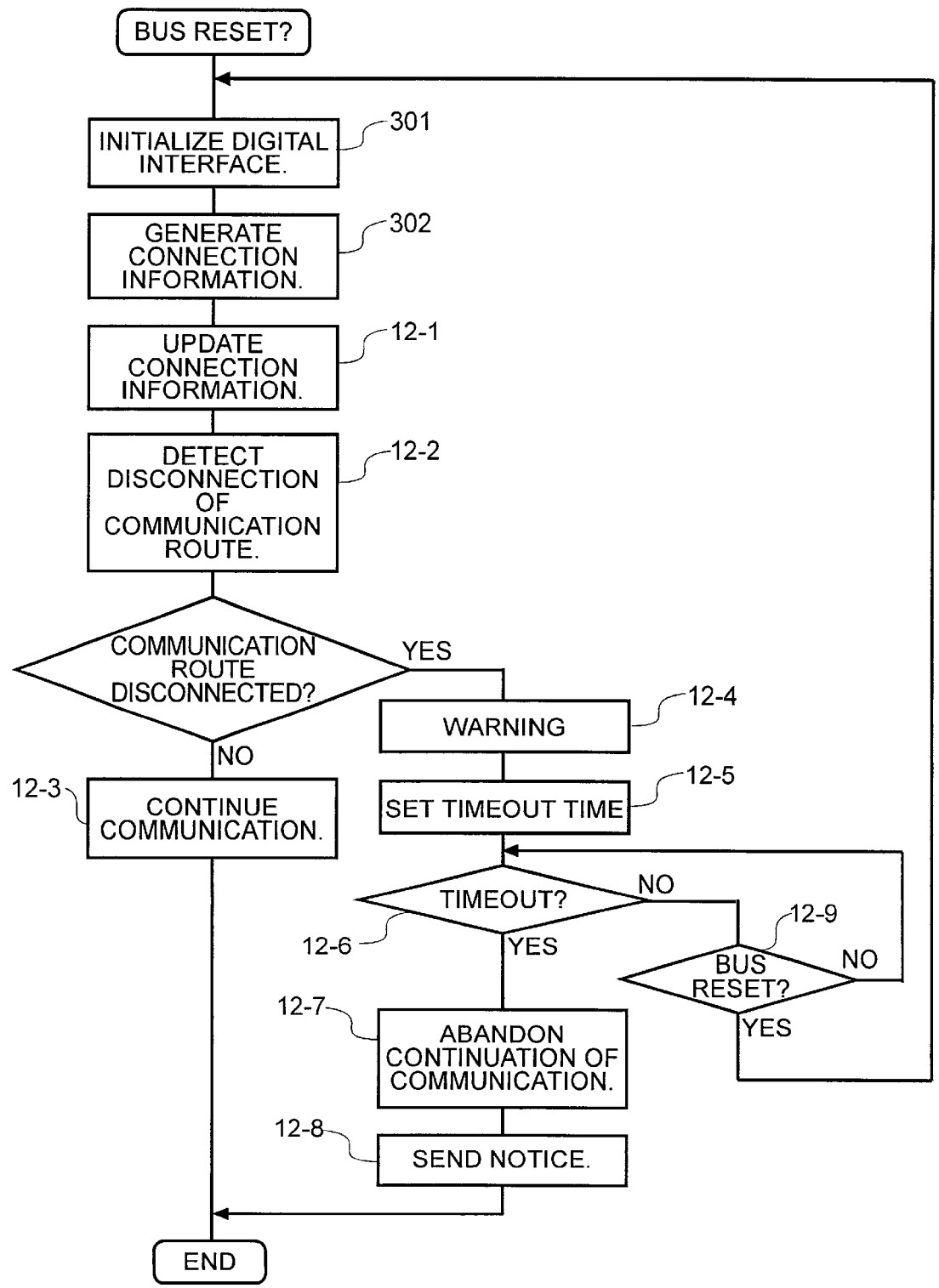
FIG. 13 is a flowchart for the processings of the controller in still another embodiment (third embodiment) of the present invention.

Next, the third embodiment of the present invention will be described with reference to the accompanying drawings. Also in this third embodiment, the network configuration shown in FIG. 6 is employed. FIG. 12 shows a block diagram of the controller in this third embodiment. In FIG. 12, the same numbers are used for the same components as those shown in FIG. 2. The reference numeral 207 denotes disconnection detecting means for detecting disconnection of a communication route detected by the communication route detecting means. The controlled devices connected to the route are the same as those shown in FIG. 10. FIG. 13 shows a flowchart for the processings of the controller in this third embodiment of the present invention. Hereinafter, the processings of the controller will be described with reference to the flowchart shown in FIG. 13. In FIG. 13, the same step numbers are used for the same processings as those in the flowcharts shown in FIGS. 3 and 11. The processings up to the notification to the user of a communication route are the same as those described with reference to FIG. 3.

When disconnection of a communication route is detected, a bus reset event always occurs. Such a bus reset event also occurs when a new electronic device is connected to a network while the communication route is not disconnected or even when an electronic device that is not on the communication route is disconnected from the network. In any case, the digital interface is initialized (step 301) just like in the processing described with reference to FIG. 3 and the connection information is generated (step 302). After that, the controller requests each connected electronic device for the connection information and updates the connection state information (step 12-1). The disconnection detecting means thus refers to the device ID information in the connection state information so as to check whether or not there is any device on the route, thereby detecting the disconnection of the communication route (step 12-2). For the detection of communication route disconnection, a device ID is used, since the node ID is possibly changed at each initialization of the digital interface. When the communication route is not disconnected, the system continues the communication (step 12-3). When disconnection of the communication route is detected, the system notifies the user of the disconnection and displays the name of any electronic device disappeared from the network so as to instruct the user to connect the electronic device to the network again (step 12-4). The system then sets a timeout time to be counted until the communication is abandoned to a proper value, for example, 30 sec (step 12-5). When a timeout occurs, the system abandons the communication (step 12-7) and notifies the user of the abandon (step 12-8). In case where a bus reset event occurs again before the timeout, the system repeats the processings from the initialization of the digital interface to the detection of the communication route disconnection (step 12-2). When no communication route disconnection is detected at this time, the communication is continued.

When an electronic device is disconnected from a network during communication such way, the disconnection is notified to the user and the user is requested to connect the device to the network again. The communication is thus continued.

INDUSTRIAL APPLICABILITY

As described above, according to the present invention, the controller connected to a network requests each of the devices connected to the network for the connection information before starting communication between subject electronic devices so as to detect a communication route between those electronic devices with use of the received connection information. The controller sends a warning message to the user so as not to disconnect each necessary electronic device from the detected communication route via the notifying means.

Consequently, the user is protected from accidental disconnection of the necessary devices from the network beforehand.

Furthermore, when the controller is provided with disconnection detecting means for detecting disconnection of a communication route detected by the communication route detecting means and the disconnection detecting means detects disconnection of a subject communication route, then the controller notifies the user of the disconnected point via the notifying means.

Consequently, when a disconnected point of a communication route is notified to the user, the user can connect the communication route again immediately.

[DOCUMENT NAME] DRAWING

[FIG. 1]
106 . . . PRINTER
[FIG. 2]
204 . . . CONNECTION INFORMATION STORING MEANS
205 . . . CONNECTION STATE STORING MEANS
206 . . . COMMUNICATION ROUTE DETECTING MEANS
208 . . . NOTIFYING MEANS
209 . . . CONTROL STORING MEANS
[FIG. 3]
BUS RESET?
301 . . . INITIALIZE DIGITAL INTERFACE.
302 . . . GENERATE CONNECTION INFORMATION.
303 . . . STORE CONNECTION INFORMATION.
304 . . . COMMUNICATION REQUEST RECEIVED?
305 . . . DETECT COMMUNICATION ROUTE.
306 . . . WARNING
[FIG. 4]
BUS RESET
401 . . . INITIALIZE BUS.
402 . . . TREE IDENTIFICATION
403 . . . DECLARE PARENT/CHILD RELATIONSHIP.
404 . . . ALL THE NODES DECLARED?
405 . . . DECIDE ROOT NODE.
406 . . . SELF-IDENTIFICATION
408 . . . BROADCAST ID INFORMATION.
409 . . . ALL THE NODES DECIDED?
[FIG. 5]
(a)
DEVICE ID
NODE ID
NUMBER OF PORTS
PORT CONNECTION INFORMATION
DESTINATION INFORMATION
(b)同上
PORT CONNECTION INFORMATION
 11: CONNECTED TO CHILD DEVICE
 10: CONNECTED TO PARENT DEVICE
 01 . . . UNCONNECTED
[FIG. 6]
ROOT NODE (103.5)<—DEVICE ID, NODE ID)
106 . . . PRINTER

PORT NO.
p: CONNECTED TO PARENT DEVICE
c: CONNECTED TO CHILD DEVICE
[FIG. 7]
DEVICE ID (DEVICE NAME)
NODE ID
NUMBER OF PORTS
CONNECTION STATE DESTINATION NODE ID
DEVICE ID (DEVICE NAME)同上 繰り返し
CONNECTION INFORMATION
11: CONNECTED TO CHILD DEVICE
10: CONNECTED TO PARENT DEVICE
01: UNCONNECTED
[FIGURE 8]
801 . . . TARGET DEVICE=SOURCE DEVICE DEVICES ON ROUTE Ns=0
802 . . . CONTROLLER?
803 . . . DEVICES ON ROUTE Ns++ROUTE DEVICE IDS_ID[Ns]=DEVICE ID
805 . . . TARGET DEVICE=PARENT DEVICE
804 . . . ROOT?
810 . . .
TARGET DEVICE=CONTROLLER DEVICES ON ROUTE Nr=0
ROUTE DEVICE?
ROUTE DEVICE COUNT Nc++ROUTE DEVICE IDC_ID[Ns]=DEVICE ID
TARGET DEVICE=PARENT DEVICE
806 . . . GENERATE DEVICE INFORMATION OF COMMUNICATION ROUTE BETWEEN SOURCE AND CONTROLLER
[FIG. 9]
WARNING!!
D-VCR—>D-TV
"SENDING A STREAM"
DO NOT DISCONNECT D-VCR, D-TV, IRD, AND PC FROM THE NETWORK.
[FIG. 10]
10-1 . . . DEVICE SPECIFIC CIRCUIT
204 . . . CONNECTION INFORMATION STORING MEANS
10-3 . . . NOTIFYING MEANS
10-2 . . . COMMUNICATION ROUTE FLAG STORING MEANS
[FIG. 11]
BUS RESET?
301 . . . INITIALIZE DIGITAL INTERFACE.
302 . . . GENERATE SELF INFORMATION.
303 . . . STORE NETWORK CONNECTION INFORMATION.
304 . . . DATA TRANSFER REQUESTED?
305 . . . SEARCH ROUTE.
306 . . . WARNING
10-1 . . . COMMUNICATE EACH DEVICE ON COMMUNICATION ROUTE.
10-2 . . . COMMUNICATION ENDED?
10-3 . . . COMMUNICATE EACH DEVICE ON COMMUNICATION ROUTE.
[FIG. 12]
204 . . . CONNECTION INFORMATION STORING MEANS
205 . . . CONNECTION STATE STORING MEANS
206 . . . COMMUNICATION ROUTE DETECTING MEANS
207 . . . DISCONNECTION DETECTING MEANS
208 . . . NOTIFYING MEANS
209 . . . CONTROL STORING MEANS
[FIG. 13]
BUS RESET
301 . . . INITIALIZE DIGITAL INTERFACE.
302 . . . GENERATE CONNECTION INFORMATION.
12-1 . . . UPDATE CONNECTION INFORMATION.
12-2 . . . DETECT DISCONNECTION OF COMMUNICATION ROUTE.
COMMUNICATION ROUTE DISCONNECTED?
12-3 . . . CONTINUE COMMUNICATION.
12-4 . . . WARNING
12-5 . . . SET TIMEOUT TIME.
12-6 . . . TIMEOUT?
12-9 . . . BUS RESET?
12-7 . . . ABANDON CONTINUATION OF COMMUNICATION.
12-8 . . . SEND NOTICE.

What is claimed is:

1. An electronic device (controller) enabled to connect a different electronic device so as to control said different electronic device remotely, said device (controller), comprising:

a communication route detecting unit for detecting a communication route between said device (controller) and said electronic devices; and notifying unit for notifying a user of said communication route detected by said communication route detecting unit, said device (controller) configured to send a flag-set command to one or more electronic devices connected along said communication route in order to set a flag that is stored in each of said one or more electronic devices.

2. The electronic device (controller) according to claim 1, wherein said communication route detecting unit requests said one or more electronic devices for connection information so as to detect said communication route based on said connection information.

3. The electronic device (controller) according to claim 1, wherein said communication route detecting unit detects said communication route in response to a request for using or reserving one of said one or more electronic devices and notifies the user of said detected communication route.

4. The electronic device (controller) according to claim 1, wherein said communication route detecting unit detects said communication route and notifies the user of said detected communication route when use of said one or more electronic devices begins.

5. The electronic device (controller) according to claim 1, wherein said detected communication route is kept notified to the user while said one or more electronic devices are being used.

6. The electronic device (controller) according to claim 1, wherein notification of said detected communication route is ended when use of said one or more electronic devices cease.

7. The electronic device (controller) according to claim 1, wherein said device (controller) sends information used to reset said communication route flag to said one or more electronic devices when use of said communication route is ended.

8. The electronic device (controller) according to claim 1, wherein said notifying unit emits or blinks the light of a corresponding LED for said notification to the user.

9. The electronic device (controller) according to claim 1, wherein said notifying unit outputs a corresponding sound for said notification to the user.

10. The electronic device (controller) according to claim 1, wherein said notifying unit outputs a warning sound for said notification to the user.

11. The electronic device (controller) according to claim 1, wherein said notifying unit combines any of methods for emitting or blinking the light of a LED, as well as for outputting a corresponding sound or a corresponding warning sound for said notification to the user.

12. The electronic device (controller) according to claim 1, wherein said device (controller) converts a warning message to information corresponding to each of the output formats of such electronic devices as ones having image display unit, unit for outputting a sound, or both of unit for displaying an image and unit for outputting a sound; and sends said warning message to each of said electronic devices or to a combination of said electronic devices.

13. The electronic device according to claim 12, wherein said device sends connection information to said different electronic device.

14. The electronic device according to claim 12, wherein said device sends connection information to said different electronic device in response to a request therefrom.

15. An electronic device (controller) enabled to connect a different electronic device so as to control said different electronic device remotely, said (controller) device, comprising:
a connection state storing unit for storing connection information of said different electronic device;
a communication route detecting unit for detecting a communication route between said device (controller) and said electronic device based on said connection information stored in said connection state storing unit; and
a notifying unit for notifying a user of said communication route detected by said communication route detecting unit,
said device (controller) configured to send a flag-set command to one or more electronic devices connected along said communication route, in order to set a flag that is stored in each of said one or more electronic devices.

16. The electronic device (controller) according to claim 15, wherein said connection state storing unit requests said electronic device connected to a network for the connection information each time a network reset event occurs so as to update connection information stored in said connection state storing unit.

17. An electronic device (controller) enabled to connect a different electronic device so as to control said different electronic device remotely, said device (controller), comprising:
a communication route detecting unit for detecting a communication route between said device (controller) and said electronic devices;
a disconnection detecting unit for detecting disconnection of said communication route detected by said communication route detecting unit; and
notifying unit for notifying a user of a result of detection by said communication route detecting unit or by said disconnection detecting unit,
said device (controller) configured to send a flag-set command to one or more electronic devices connected along said communication route, in order to set a flag that is stored in each of said one or more electronic devices,
said device (controller) further configured to send a flag-reset command to said one or more electronic devices, in order to clear each said flag.

18. The electronic device (controller) according to claim 17, wherein said disconnection detecting unit, when detecting disconnection of one of said one or more electronic devices, notifies the user of said disconnection.

19. The electronic device (controller) according to claim 17, wherein said electronic device (controller) holds connection information and continues communication when said communication route is connected again within a predetermined time after said disconnection detecting unit detects disconnection of one of said one or more electronic devices.

20. The electronic device (controller) according to claim 19, wherein said predetermined time is 30 seconds.

21. The electronic device (controller) according to claim 19, wherein said device (controller) is configured so as not to assure communication data while said communication route is disconnected.

22. The electronic device (controller) according to claim 17, wherein said device (controller) suppresses said notification to the user of a change of a network in case where said disconnection detecting unit detects no disconnection from said network after a network reset event occurs due to connection of a new electronic device or disconnection of an electronic device from said network.

23. An electronic device (controller) enabled to connect a different electronic device so as to controls said different electronic device remotely, said device (controller), comprising:
a connection state storing unit for storing connection information of said different electronic device connected to a network;
a communication route detecting unit for detecting a communication route between said device (controller) and said electronic devices based on said connection information stored in said connection state storing unit;
disconnection detecting unit for detecting disconnection of said communication route detected by said communication route detection unit; and
a notifying unit for notifying the user of a result of detection by said communication route detecting unit or by said disconnection detecting unit,
said device (controller) configured to send a flag-set command to one or more electronic devices connected along said communication route, in order to set a flag that is stored in each of said one or more electronic devices,
said device (controller) further configured to send a flag-reset command to said one or more electronic devices, in order to clear each said flag.

24. An electronic device comprising:
a communication route flag data store having a first value when said electronic device is connected along a communication route that is connected between a first electronic device and a second electronic device, and having a second value when said electronic device is not connected along a communication route that is connected between a first electronic device and a second electronic device; and
a display unit for indicating the value that is stored in said communication route flag data store,
said electronic device configured to receive a flag-set command and a flag-reset command from a different electronic device (controller), to store said first value in said communication route flag data store in response to receiving said flag-set command, and to store said second value in said communication route flag data store in response to receiving said flag-reset reset command.

* * * * *